US010871238B2

(12) United States Patent
Baker et al.

(10) Patent No.: US 10,871,238 B2
(45) Date of Patent: Dec. 22, 2020

(54) REMOVABLE VALVE GUARD FOR AMPOULES

(71) Applicant: Versum Materials US, LLC, Tempe, AZ (US)

(72) Inventors: John Eric Baker, Tempe, AZ (US); Charles Michael Birtcher, Tempe, AZ (US)

(73) Assignee: VERSUM MATERIALS US, LLC, Tempe, AZ (US)

( * ) Notice: Subject to any disclaimer, the term of this patent is extended or adjusted under 35 U.S.C. 154(b) by 0 days.

(21) Appl. No.: 16/031,432

(22) Filed: Jul. 10, 2018

(65) Prior Publication Data

US 2019/0024816 A1 Jan. 24, 2019

Related U.S. Application Data

(60) Provisional application No. 62/534,047, filed on Jul. 18, 2017.

(51) Int. Cl.
| F16K 27/12 | (2006.01) |
| F16K 35/06 | (2006.01) |
| F16K 31/46 | (2006.01) |
| F17C 13/04 | (2006.01) |

(52) U.S. Cl.
CPC ............. *F16K 27/12* (2013.01); *F16K 31/46* (2013.01); *F16K 35/06* (2013.01); *F17C 13/04* (2013.01); *F17C 2205/0308* (2013.01); *Y10T 137/7062* (2015.04)

(58) Field of Classification Search
CPC ............ F16K 27/12; Y10T 137/7062; F17C 2205/0308
See application file for complete search history.

(56) References Cited

U.S. PATENT DOCUMENTS

| D273,510 S | * | 4/1984 | Mayor | .......................... 220/724 |
| 4,899,968 A | * | 2/1990 | Eaglin | ....................... A47F 5/02 |
| | | | | 211/78 |
| 6,415,946 B2 | * | 7/2002 | Carlo | ...................... F17C 13/04 |
| | | | | 220/724 |
| 6,526,824 B2 | * | 3/2003 | Chase | ................. G01F 23/2961 |
| | | | | 141/18 |
| 6,913,034 B2 | * | 7/2005 | Szafron | ................... F16K 31/16 |
| | | | | 137/382 |
| 7,089,956 B1 | * | 8/2006 | Davidson | ................ F16K 1/305 |
| | | | | 137/377 |
| 2002/0108670 A1 | * | 8/2002 | Baker | .................. B67D 1/0871 |
| | | | | 141/18 |
| 2004/0016855 A1 | | 1/2004 | Berry et al. | |

FOREIGN PATENT DOCUMENTS

| CN | 201217128 Y | 4/2009 |
| CN | 203095566 U | 7/2013 |
| CN | 204363845 U | 6/2015 |
| CN | 205191217 U | 4/2016 |
| CN | 206202957 U | 5/2017 |

* cited by examiner

*Primary Examiner* — Kevin F Murphy
(74) *Attorney, Agent, or Firm* — Lina Yang (57) ABSTRACT

A fully removable chime or valve guard that can support the container on its top, side and bottom is provided. The removable chime or valve guard provides protection if the container is dropped on its side or top. The protection provided allows the containers to pass a drop test per 49 CFR section 178.603, so the containers can be certified per 49 CFR 178.504.

18 Claims, 6 Drawing Sheets

REMOVABLE VALVE GUARD FOR AMPOULES

CROSS REFERENCE TO RELATED PATENT APPLICATIONS

The application claims the benefit of U.S. Application No. 62/534,047 filed on Jul. 18, 2017. The disclosure of Application No. 62/534,047 is hereby incorporated by reference.

BACKGROUND OF THE INVENTION

The present invention relates generally to a fully removable valve guard or chime (they are used interchangeably) for ampoules or container (they are used interchangeably) used for packaging and delivering special or dangerous materials, such as for semiconductor deposition materials.

Any non-removable head steel drums (1A1) or removable head steel drums (1A2) must meet the requirements of the 49th Code of Federal Regulations (49CFR) section 178.504. Part of this requirement is a guard or "chime" that protects any closures, such as valves, on the container in the event of a fall.

The main test of this protection is referred to as the "Drop Test" per 49CFR section 178.603. The height of the drop is determined by the Packing Group (PG) of the dangerous good and the specific gravity of the dangerous good when it is meant for liquids. There are three packaging groups I, II and III where I is the highest hazard and III is the lowest hazard.

For purposes of dangerous goods, it would be for PG I and specific gravity of 1.8. That will cover all current hazardous liquid materials that would be transported in this package. The drop height for these conditions is 8.82 feet. For a 1A1 or 1A2, it must be dropped using two different orientations. The first drop must strike the drop target diagonally on the chime and the second is what would be considered the next weakest orientation, most likely on its side. Normally this protective chime is permanently attached to the container, but that is not a requirement. It is sometimes preferred to have the chime removable or adjustable for an end user to more easily access ports for dispensing the material.

In Air Liquide's Aloha™ chime ring design (Aloha™ ALD/CVD Products catalogue), the chime is clamped to sides of the container via two bolts. This design only secures the ampoule on the side and will not protect it in the event of an inverted drop.

Some other designs rely on one of the followings: a flange to secure the valve guard on the top and bottom; on through holes on flange of container to secure the valve guard via bolts on the chime posts; relies on tabs welded to the secure cover via bolts; welded on sleeves to secure chime via pins; or permanent special features added to the container to secure the chime.

Most designs are not certified per 49CFR 178.504.

Thus, there is a strong need for chime designs that can secure the ampoule on the side, top and bottom to give better protection if the container is dropped on its side or top. The design also can be certified per 49CFR 178.504.

BRIEF SUMMARY OF THE INVENTION

The needs are satisfied by using the disclosed invention.

This invention is a fully removable chime or valve guard that can support the container on its top, side and bottom giving much better protection if the container is dropped on its side or top.

The valve guard can be used with the existing fleet without any modification to the various cylindrical containers. This will also allow the various containers to be used in the current equipment with no changes required to the equipment.

In one aspect, the invention is a fully removable valve guard for a cylindrical container to support the container on its top, side and bottom, the valve guard comprising:

(1) a top part comprises:
   a top ring having a center ring line presenting middle line of the top ring; and
   at least two, preferably at least three, and more preferably at least four posts; wherein
      each post is bent twice to form top, middle and bottom sections wherein axis of the top section and axis of the bottom section are parallel or cross at an angle from >0 to 5 degree;
      each post comprises a flat contact extending radially inward from top of the bottom section;
      and
      the axes of the bottom sections of the posts are on a virtual bottom ring that is smaller than the top ring, wherein the virtual bottom ring and the top ring are concentric;
   wherein
   top end of each post is attached to bottom of the top ring along the center ring line at right angle with varying preferably even distances;
and
(2) a base comprises:
   a hollow cylinder having an outer surface with an outer diameter and an inner surface with an inner diameter;
   at least two, preferably at least three, and more preferably at least four tubes being smaller than the hollow cylinder;
   and
   a bottom covering all or partial of bottom hollow surface of the hollow cylinder;
   wherein
   the tubes are vertically connected to top outer surface of the hollow cylinder at various preferably even distances and axes of the tubes are parallel to axis of the hollow cylinder; and
   the inner diameter of the hollow cylinder is larger than outer diameter of the cylindrical container and the outer diameter of the hollow cylinder is smaller than diameter of the virtual bottom ring.

The removable valve guard can further comprise
(1) an outer hollow cylinder having inner surface with an inner diameter that equals sum of the outer diameter of the hollow cylinder plus twice the diameter of the tubes; and
(2) a bottom covers all bottom hollow surface of the outer hollow cylinder;
   wherein
   the outer hollow cylinder and the hollow cylinder are concentric and connected to the same base; and
   a hollow cylindrical annular volume is formed between the outer surface of the hollow cylinder and the inner surface of the outer hollow cylinder.

The hollow cylindrical volume is up to 110%, for example 100% to 110% of the fill volume of the cylindrical container. The annular volume will act as spill containment for the container.

The top part of the fully removable valve guard can be connected to the base by plugging the posts into the respective tubes in the base.

The post can further comprise a thread section near end of the bottom section. And, the removable valve guard further comprises nuts and washers screwing up along each thread section at the bottom of the respective tube to secure the top part to the base.

The post can further comprise at least one hole in the bottom section through its side in a direction tangent to the virtual bottom ring; each tube further comprises at least one hole through its side in a direction tangent to the outer surface of the hollow cylinder and at a right angle with the axis of the tube; and one of the at least one hole in the post is aligned with one of the at least one hole in the tube. And, the removable valve guard further comprises pins or bolts inserted through the aligned holes to secure the top part to the base.

The cylindrical container is placed (inserted) in the hollow cylinder of the base and the flat contacts are contacting top surface of the cylindrical container; wherein cylindrical container is secured, clamped, or guarded with the flat contacts, the bottom of the base, the top ring and the posts of the fully removable valve guard thus the valves are protected from damage such that it can pass a drop test per 49CFR 178.603.

In another aspect, the invention is another fully removable valve guard for a cylindrical container to support the container on its top, side and bottom, the valve guard comprising:

(1) a clamp comprises
  (a) middle portion has two equal halves of a hollow cylinder;
    wherein the two halves are joined by a hinge on one side and by at least 2 removable bolts on other side;
  (b) bottom portion has two equal halves of a circular plate connected to bottom of halves of the hollow cylinder; and
  (c) top portion has two equal halves of a circular plate connected to top of the two halves of the hollow cylinder;
    wherein diameter of the circular plate equals diameter of the hollow cylinder; and the top portion of the clamp encloses portions of the cylindrical container top and features on the cylindrical container top;
(2) at least two chime bars; and
(3) at least four posts, wherein each post is bent outward at least once to have a bent top section and unbent bottom section;
wherein
the bent top sections of every two posts are connected to bottom of one of the chime bars and the unbent bottom sections are connected to one half of the hollow cylinder; and
distance between the bent top sections is larger than distance between the unbent bottom sections.

In yet another aspect, the invention is a delivery and packaging system for a material, comprising:
a cylindrical container containing the material; and
a fully removable valve guard for supporting the cylindrical container on its top, side and bottom described above.

Other aspects, features and embodiments of the invention will be more fully apparent from the ensuing disclosure and appended claims.

DETAILED DESCRIPTION OF THE INVENTION

The current stainless steel containers in various fleets that are <4 L in capacity, when used for transporting dangerous goods, must be shipped in a combination packaging.

A combination packaging, per the 49th Code of Federal Regulations (49CFR) section 171.8, is a combination of packaging, for transport purposes, consisting of one or more inner packaging secured in a non-bulk outer packaging. In the case of various packaging for these, the outer package is either a cardboard box or natural wood box and the container is secured with various foam inserts.

This invention is a fully removable valve guard that can be used with the existing fleet without any modification to the various containers. It will support the container on its top, side and bottom giving much better protection if the container is dropped on its side or top. Its attachment only relies on the cylindrical shape of the container. This will also allow the various containers to be used in the current equipment with no changes required to the equipment. The invention is useful for all container capacities, include but are not limited to 8.8 L, 2.7 L 1.8 L or 1.2 L.

The fully removable valve guard has a top part and a base.

The base is a hollow cylinder having an axis, an outer surface with an outer diameter, an inner surface with an inner diameter (ID), and a bottom which covers all or partial of the bottom hollow surface of the hollow cylinder. The material of the base can be stainless steel.

There are at least two, preferably at least three, and more preferably at least four tubes (can be stainless steel) which are smaller hollow cylinder. The vertical cross section of the tube can be any shape includes but is not limited to circular, square, rectangular, oval, et al. Each tube has an axis.

The tubes are vertically connected (can be welded) to the top outer surface of the hollow cylinder at preferably even distances. The axes of all tubes are parallel to the axis of the hollow cylinder. The tubes are located on a ring which has the centerline determined by the axes of the tubes.

Each tube can further optionally have at least one hole, preferably at least two holes through its side in a direction tangent to the outer surface of the hollow cylinder at the point the tube is attached and at a right angle with the axis of the tube. These holes are located at a distance from the end of each tube.

Figure 1:
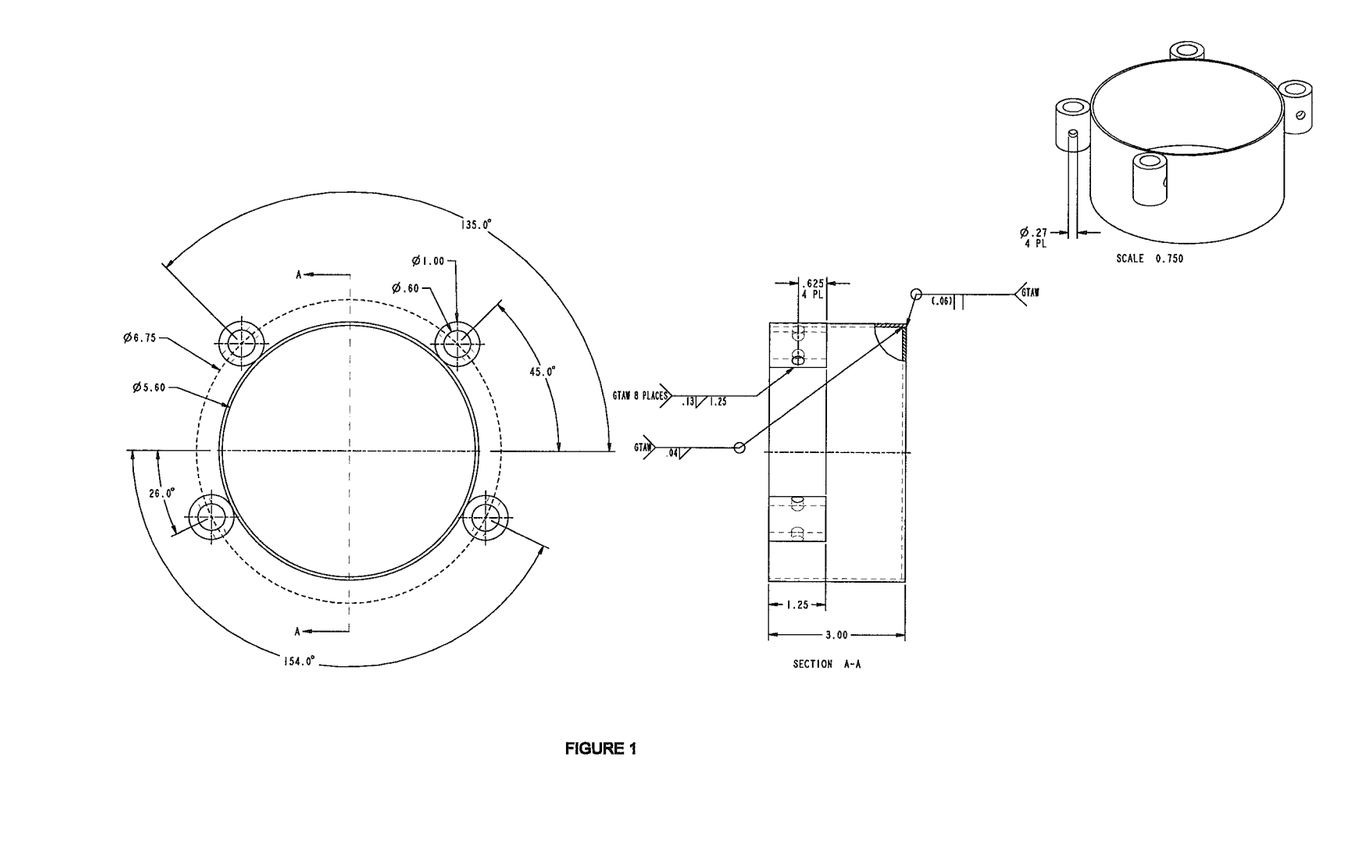
FIG. 1 shows the base of a removable valve guard.

FIG. 1 shows the base of the fully removable valve guard.

Figure 2:
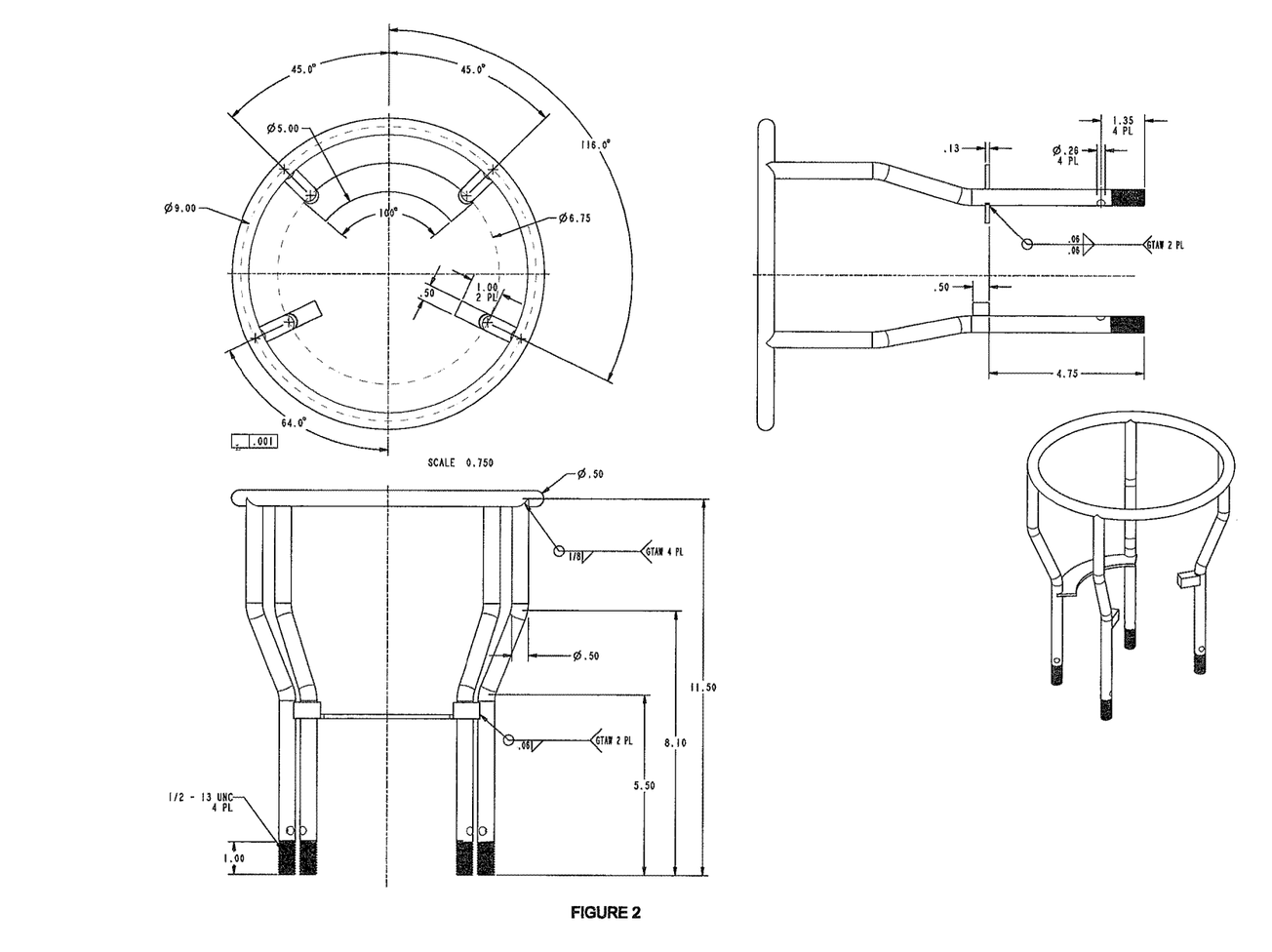
FIG. 2 shows the top part of a removable valve guard.

The dimensions used in FIG. 2 is for a 1.2 L cylindrical ampoule as an example. It has 5.6" ID and is 3" tall. It has four 1" outer diameter (OD)×0.6" ID stainless steel tubes.

In the drawing (FIG. 1), each tube has a 0.27" diameter hole. These holes are located 0.625" from the end of each tube.

The top part of the fully removable valve guard has a top ring (solid or hollow); and at least two, preferably three, more preferably four posts (solid or hollow).

The top ring has a center ring line presenting the middle ring line of the top ring.

Each post is bent twice to form top, middle and bottom sections. The axis of the top section and axis of the bottom section of are parallel.

All posts have their top surfaces attached to the bottom of the top ring at the right angle along the center ring line of the top ring at preferably even distances. The post is kept at the right angle in the top and bottom sections, while not in the middle section.

The axis of the top section and axis of the bottom section of can also cross at an angle from >0 to 5 degree.

The axis of the top section of each post can be further perpendicular to the center ring line of the top ring.

The axes of the bottom sections of the posts are on a virtual bottom ring that is smaller than the top ring. The top ring and the virtual bottom ring are concentric.

Each post comprises a flat contact extending radially inward at the top of the bottom section to clamp the cylindrical ampoule at the top face of the cylindrical ampoule thus to prevent movement of the chime along its axis and to secure the cylindrical ampoule between the flat contacts and the bottom of the base.

The flat contact can extend perpendicularly to axis of the top ring;

Each post can further comprise a thread section in the bottom section towards the end of the post for the insertion of the thread section into the respective tube in the base.

Each post can further optionally comprise at least one hole in the bottom section through its side in a direction tangent to the virtual bottom ring.

One of the at least one hole in the post is preferably aligned with one of the at least one hole in the tube of the base.

FIG. 2 shows the top part of the fully removable valve guard. The dimensions used in the drawing is for a 1.2 L cylindrical ampoule as an example.

It has a ½" diameter stainless steel bar formed into a 9" diameter ring. Four ½" diameter stainless steel posts are formed and attached to the bottom of the ring at the right angle and is nearly equal distance positioned around the 9" ring. Each post has a ½"-13 UNC thread section for a length of 1" from the end of the post.

Also, each post has a 0.26" diameter hole through its side in a direction tangent to the 9" diameter ring at the point the post joins the ring. The hole is located 1.35" from the end of the post.

The posts are each bent in two places such that the top of the posts is welded on the center line of the 9" diameter ring and the bottom axis of each post is located on a 6.75" diameter circle. The flat contacts are attached to each of these four posts such that they create a surface at a distance of 4.75" from the ends of the posts and extend 1" radially inward from the 6.75" diameter circle.

The flat contacts can further be perpendicular to the axis of the 9" ring

The dimensions of the base such as the inner diameter (ID) and height of the hollow cylinder is based on the cylindrical ampoule to be inserted. The cylindrical ampoule has to be inserted in the hollow cylinder with the top surface of the cylindrical ampoule at or above the top surface of the hollow cylinder.

The dimensions of the guard top portion such as the bends in the posts and the location of the flat contacts are also based on the dimensions of the base and ultimately, the dimensions of the cylindrical ampoule to be protected.

The inner diameter of the hollow cylinder is larger than outer diameter of the cylindrical container and the outer diameter of the hollow cylinder is smaller than diameter of the virtual bottom ring. Thus, each post in the top part can be inserted into a respective tube in the base.

Figure 3:
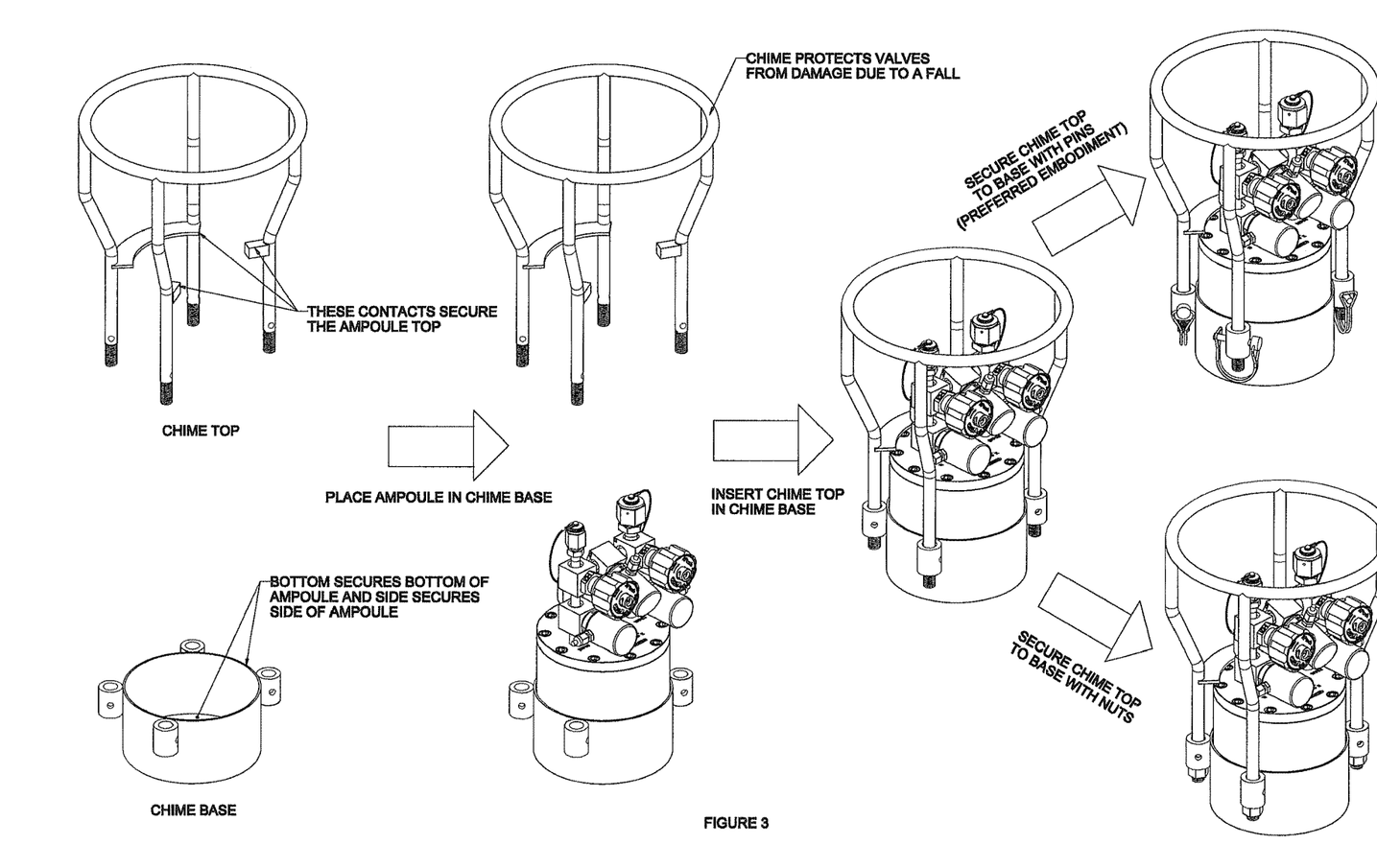
FIG. 3 shows the operation of a removable valve guard.

FIG. 3 illustrates how to operate a fully removable valve guard for a 1.2 L cylindrical ampoule as an example.

The cylindrical ampoule is placed or inserted in the base at any orientation with its top surface at or above the top surface of the base. The flat contacts are above and contacting the top surface of the cylindrical ampoule.

The top part of the fully removable valve guard is connected to the base by inserting each post in each of the respective tubes.

If both posts and tubes contain holes, then at least one of the holes, preferably, all holes in the posts, is or are aligned with one of the holes or all holes in the respective tube.

As an example, the 0.26" holes in the posts line up with the 0.27" diameter holes in the tubes of the base.

¼" steel pins or bolts are inserted through the tube and post at each of four locations to secure the chime top to the chime base.

In another embodiment, the ½"-13 UNC thread section of posts and ½"-13 UNC nuts and washers are used.

In this embodiment, the nuts and washers are threaded or screwed onto each of the posts so that the cylindrical ampoule is clamped between the flat contacts and the bottom of the chime base.

In yet another embodiment, the combinations of the holes with pins or bolts and the nuts and washers described in the previous embodiments are used.

In all embodiments, the flat contacts, the chime base bottom, the chime base side and the chime top together keep the container within the guard of the 9" ring and posts, and protect the valves from damage such that it can pass a drop test per 49CFR 178.603.

Figure 4:
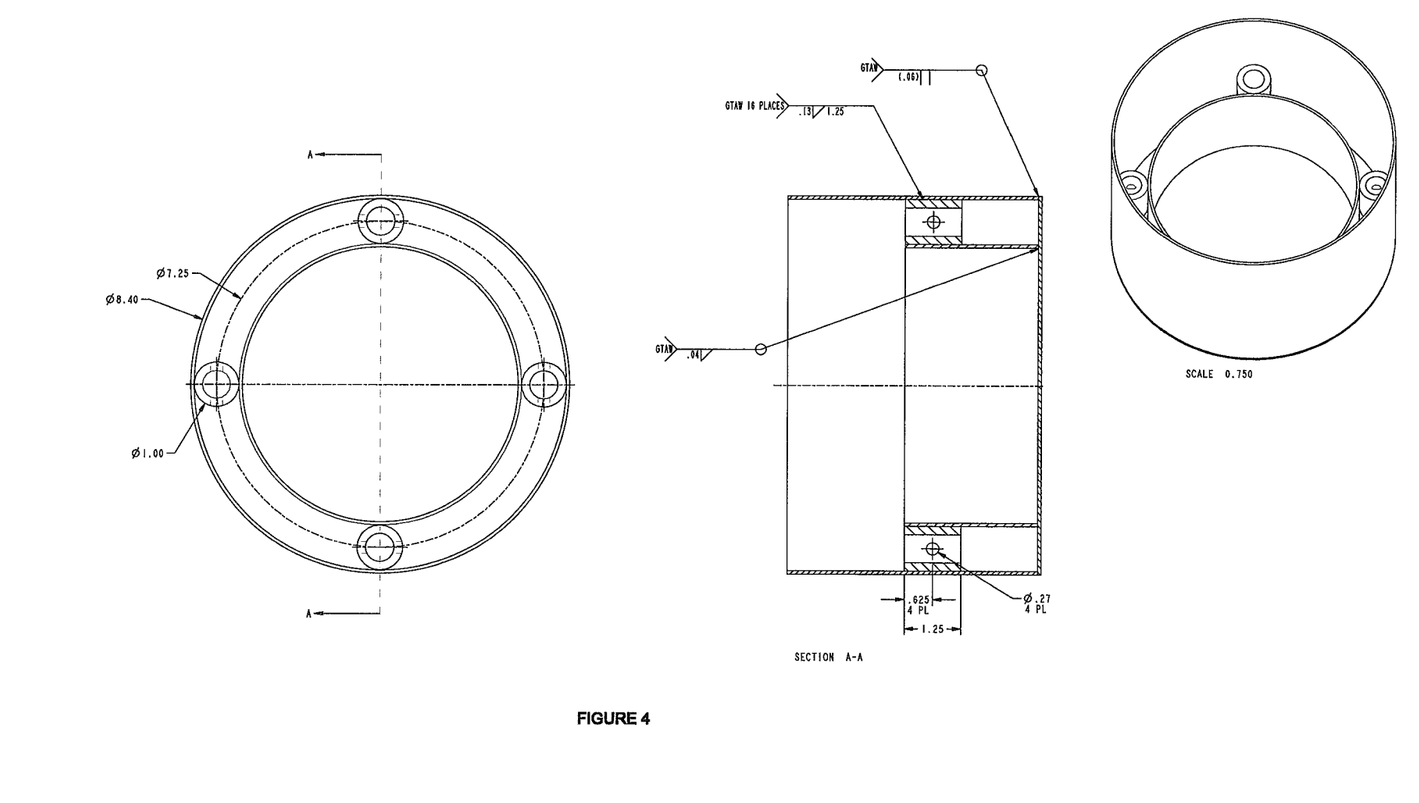
FIG. 4 shows the modified base of a removable valve guard.
Figure 5:
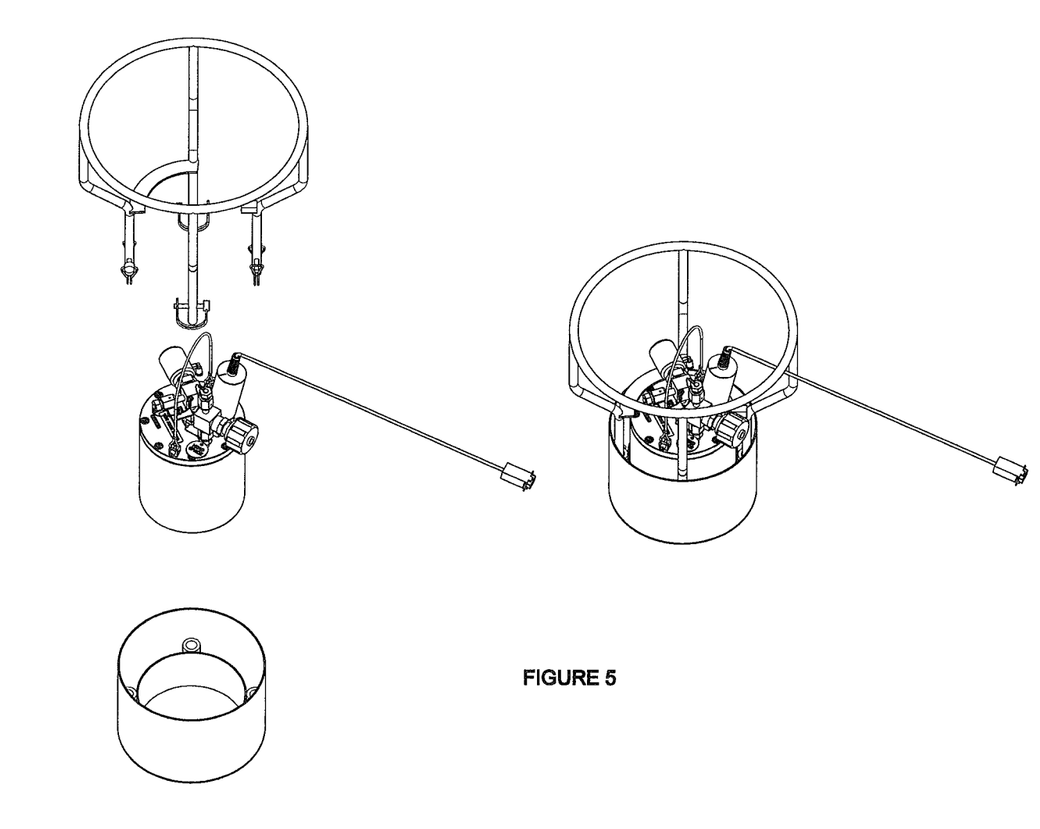
FIG. 5 shows the operation of a removable valve guard with the modified base

Another embodiment of this design is shown in FIGS. 4 and 5. This embodiment is a modified embodiment as shown in FIGS. 1 to 3.

The hollow cylinder shown in FIGS. 1 to 3 serves as an inner hollow cylinder. An outer hollow cylinder has a diameter that equals to the sum of the outer diameter of the inner hollow cylinder plus twice the diameter of the tubes. The outer hollow cylinder and the inner cylinder are concentric. The bottoms of both hollow cylinders are connected to a common circular base that covers all hollow bottom space of the outer hollow cylinder.

There is a hollow cylindrical annular space or volume formed between the two hollow cylinders, that is, the space between the outer surface of the inner hollow cylinder and the inner surface of the outer hollow cylinder. This will act as spill containment for the container. The space or volume can be as big as required, for example, up to 110%, or 100% to 110% containment of the fill volume of the cylindrical container containing material. Please note the height of the outer hollow cylinder is determined by the required volume.

Figure 6:
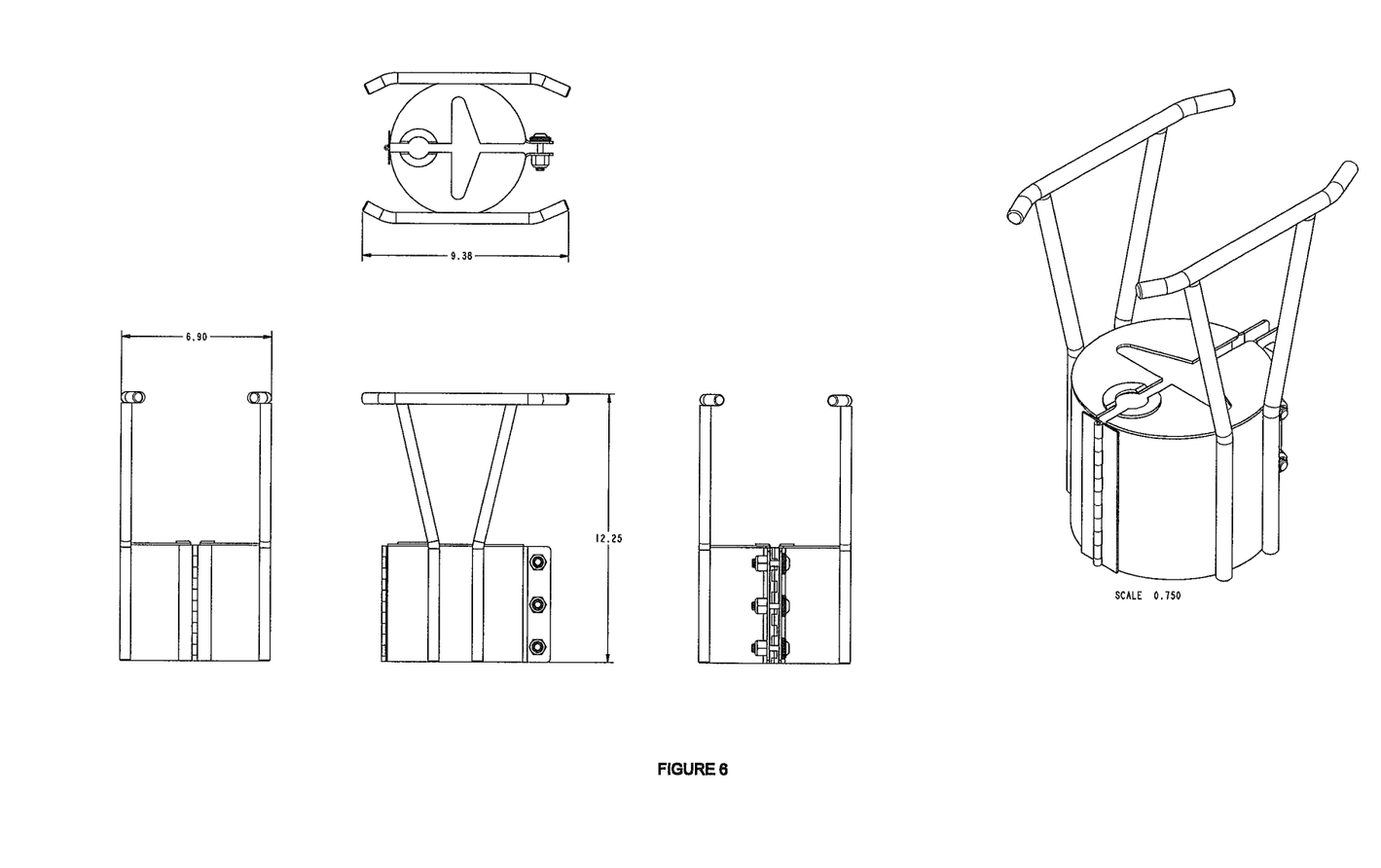
FIG. 6 shows an alternate design of a removable valve guard.

Shown in FIG. 6 is an alternate design of a fully removable chime or valve guard for supporting a cylindrical container on its top, side and bottom.

The fully removable chime shown in FIG. 6 has a clamp around the side of a cylindrical container where the chime posts are welded to the two halves (of a hollow cylinder) of the clamp and the clamp is hinged on one side and closed with at least two preferably, at least three removable bolts on other side, 180 degrees opposed to apply a normal force with respect to the cylindrical side. The top portion of the clamp encloses portions of the container top and features on the top to prevent movement of the chime along its axis.

The chime has at least two chime bars and at least four posts. Each post is bent outward at least once to have a bent top section and unbent bottom section. The bent top sections of every two posts are connected to bottom of one of the chime bars and the unbent bottom sections are connected (welded) to one half of the hollow cylinder. The distance between the bent top sections is larger than distance between the unbent bottom sections.

The foregoing examples and description of the embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A fully removable valve guard for supporting a cylindrical container on its top, side and bottom; comprising:
 (1) a top part comprises: a top ring having a center ring line; and at least two posts; wherein
  each post is bent twice to form top, middle, and bottom sections wherein an axis of the top section of each post and an axis of the bottom section of each post are parallel or cross at an angle of ≤5 degree;
  each post comprises a flat contact extending radially inward from a top of the bottom section; and
  the axes of the bottom sections of the posts are on a virtual bottom ring that is smaller than the top ring, wherein the virtual bottom ring and the top ring are concentric;
  wherein a top end of each post is attached to a bottom of the top ring along the center ring line at right angles; and
  the posts are evenly spaced along the center ring line; and
 (2) a base comprises:
  a hollow cylinder having an outer surface with an outer diameter and an inner surface with an inner diameter;
  at least two tubes being smaller than the hollow cylinder; and a bottom covering all or part of a bottom hollow surface of the hollow cylinder;
  wherein
  the tubes are vertically connected to a top outer surface of the hollow cylinder and are spaced horizontally;
  and axes of the tubes are parallel to an axis of the hollow cylinder; and
  the inner diameter of the hollow cylinder is larger than an outer diameter of the cylindrical container and the outer diameter of the hollow cylinder is smaller than a diameter of the virtual bottom ring;
  wherein the cylindrical container is optionally placed in the hollow cylinder and guarded with the flat contacts, the bottom of the base, the top ring, and the posts while the top part is connected to the base by plugging the posts into the respective tubes in the base.

2. The removable valve guard of claim 1, wherein the flat contacts extend perpendicularly to an axis of the top ring; the tubes are evenly spaced horizontally; and the axis of the top section of each post is perpendicular to the center ring line of the top ring.

3. The removable valve guard of claim 1, wherein each post further comprises a thread section near end of the bottom section; and the removable valve guard further comprises nuts and washers screwing up along each thread section at the bottom of the respective tube to secure the top part to the base.

4. The removable valve guard of claim 1, wherein each post further comprises at least one hole in the bottom section through its side in a direction tangent to the virtual bottom ring; each tube further comprises at least one hole through its side in a direction tangent to the outer surface of the hollow cylinder and at a right angle with the axis of the tube; and one of the at least one hole in the post is aligned with one of the at least one hole in the tube; and the removable valve guard further comprises pins or bolts inserted through the aligned holes to secure the top part to the base.

5. The removable valve guard of claim 1, wherein the top part comprises four posts and the base comprises four tubes.

6. The removable valve guard of claim 5, wherein the flat contacts extend perpendicularly to an axis of the top ring; the tubes are evenly spaced horizontally; and the axis of the top section of each post is perpendicular to the center ring line of the top ring.

7. The removable valve guard of claim 5, wherein each post further comprises
 (1) a thread section near end of the bottom section; and the removable valve guard further comprises nuts and washers screwing up along each thread section at the bottom of the respective tube to secure the top part to the base; or
 (2) at least one hole in the bottom section through its side in a direction tangent to the virtual bottom ring; each tube further comprises at least one hole through its side in a direction tangent to the outer surface of the hollow cylinder and at a right angle with the axis of the tube; and one of the at least one hole in the post is aligned with one of the at least one hole in the tube; and the removable valve guard further comprises pins or bolts inserted through the aligned holes to secure the top part to the base.

8. The removable valve guard of claim 1, wherein the base further comprises
 (1) an outer hollow cylinder having inner surface with an inner diameter that equals a sum of the outer diameter of the hollow cylinder plus twice the diameter of the tubes; and
 (2) the bottom covers an entire bottom of the outer hollow cylinder;
 wherein
 the outer hollow cylinder and the hollow cylinder are concentric and connected to the bottom; and
 a hollow cylindrical volume is formed between the outer surface of the hollow cylinder and the inner surface of the outer hollow cylinder.

9. The removable valve guard of claim 8, wherein the cylindrical container has a fill volume and the hollow cylindrical annular volume is 100% to 110% of the fill volume.

10. A delivery and packaging system for a material, comprising: a cylindrical container containing the material; and
 a fully removable valve guard for supporting the cylindrical container on its top, side and bottom, comprising:
 1) a top part comprises:
 a top ring having a center ring line; and
 at least two posts; wherein
  each post is bent twice to form top, middle, and bottom sections wherein an axis of the top section of each post and an axis of the bottom section of each post are parallel or cross at an angle of ≤5 degree;
  each post comprises a flat contact extending radially inward from top of the bottom section; and
  the axes of the bottom sections of the posts are on a virtual bottom ring that is smaller than the top ring, wherein the virtual bottom ring and the top ring are concentric;

wherein
a top end of each post is attached to a bottom of the top ring along the center ring line at right angles; and
the posts are evenly spaced along the center ring line; and
2) a base comprises:
a hollow cylinder having an outer surface with an outer diameter and an inner surface with an inner diameter;
at least two tubes being smaller than the hollow cylinder; and a bottom covering all or part of a bottom hollow surface of the hollow cylinder;
wherein
the tubes are vertically connected to a top outer surface of the hollow cylinder and are spaced horizontally; and axes of the tubes are parallel to an axis of the hollow cylinder; and
the inner diameter of the hollow cylinder is larger than outer diameter of the cylindrical container and the outer diameter of the hollow cylinder is smaller than a diameter of the virtual bottom ring;
wherein the cylindrical container is optionally placed in the hollow cylinder and guarded with the flat contacts, the bottom of the base, the top ring, and the posts while the top part is connected to the base by plugging the posts into the respective tubes in the base.

11. The delivery and packaging system for a material of claim 10, wherein the flat contacts extend perpendicularly to an axis of the top ring; the tubes are vertically connected to top outer surface of the hollow cylinder and the tubes are evenly spaced horizontally; and the axis of the top section of each post is perpendicular to the center ring line of the top ring.

12. The delivery and packaging system for a material of claim 10, wherein each post further comprises a thread section near end of the bottom section; and the removable valve guard further comprises nuts and washers screwing up along each thread section at the bottom of the respective tube to secure the top part to the base.

13. The delivery and packaging system for a material of claim 10, wherein each post further comprises at least one hole in the bottom section through its side in a direction tangent to the virtual bottom ring; each tube further comprises at least one hole through its side in a direction tangent to the outer surface of the hollow cylinder and at a right angle with the axis of the tube; and one of the at least one hole in the post is aligned with one of the at least one hole in the tube; and the removable valve guard further comprises pins or bolts inserted through the aligned holes to secure the top part to the base.

14. The delivery and packaging system for a material of claim 10, wherein the top part comprises four posts and the base comprises four tubes.

15. The delivery and packaging system for a material of claim 14, wherein the flat contacts extend perpendicularly to an axis of the top ring; the tubes are evenly spaced horizontally; and the axis of the top section of each post is perpendicular to the center ring line of the top ring.

16. The delivery and packaging system for a material of claim 14, wherein each post further comprises
(1) a thread section near end of the bottom section; and the removable valve guard further comprises nuts and washers screwing up along each thread section at the bottom of the respective tube to secure the top part to the base; or
(2) at least one hole in the bottom section through its side in a direction tangent to the virtual bottom ring; each tube further comprises at least one hole through its side in a direction tangent to the outer surface of the hollow cylinder and at a right angle with the axis of the tube; and one of the at least one hole in the post is aligned with one of the at least one hole in the tube; and the removable valve guard further comprises pins or bolts inserted through the aligned holes to secure the top part to the base.

17. The removable valve guard of claim 1, wherein the base further comprises
(1) an outer hollow cylinder having inner surface with an inner diameter that equals a sum of the outer diameter of the hollow cylinder plus twice the diameter of the tubes; and
(2) the bottom covers an entire bottom of the outer hollow cylinder;
wherein
the outer hollow cylinder and the hollow cylinder are concentric and connected to the bottom; and
a hollow cylindrical volume is formed between the outer surface of the hollow cylinder and the inner surface of the outer hollow cylinder.

18. The delivery and packaging system for a material of claim 10, wherein the cylindrical container has a fill volume and the hollow cylindrical annular volume is 100% to 110% of the fill volume.

\* \* \* \* \*